United States Patent [19]
Shinjo

[11] 3,797,547
[45] Mar. 19, 1974

[54] METHOD OF PRODUCING A LOCKING NUT WITH AN INSERT

[76] Inventor: Katsumi Shinjo, 8,6-Chome, Asahi Minamidori, Nishinariku, Japan

[22] Filed: May 10, 1971

[21] Appl. No.: 141,687

[52] U.S. Cl. .................................. 151/7, 10/86 A
[51] Int. Cl. ........................................ F16b 39/284
[58] Field of Search ...................... 151/7; 10/86 A

[56]  References Cited
UNITED STATES PATENTS

| 1,874,829 | 8/1932 | Swanstrom | 10/86 A |
| 135,864 | 2/1873 | Thompson et al. | 151/7 |
| 2,330,999 | 10/1943 | Ruthuen | 151/7 |
| 2,450,694 | 10/1948 | Sauer | 151/7 |
| 3,018,519 | 1/1962 | Morin et al. | 151/7 |
| 3,316,338 | 4/1967 | Rieke | 151/7 |

FOREIGN PATENTS OR APPLICATIONS

| 541,697 | 12/1941 | Great Britain | 151/7 |
| 123,346 | 1/1947 | Australia | 151/7 |

Primary Examiner—Edward C. Allen
Attorney, Agent, or Firm—Arnold Robinson; William D. Lucas; Frank J. DeRosa

[57] ABSTRACT

A method of producing a locking nut with a resilient insert on its face is disclosed. An ordinary four-sided nut is pressed between a die provided with a flared opening, and a punch provided with a tapered lower end to match the shape of the die. Each corner of the nut is drawn to produce outwardly opening thin tabs, which tabs are subsequently folded over an insert placed on the nut.

3 Claims, 9 Drawing Figures

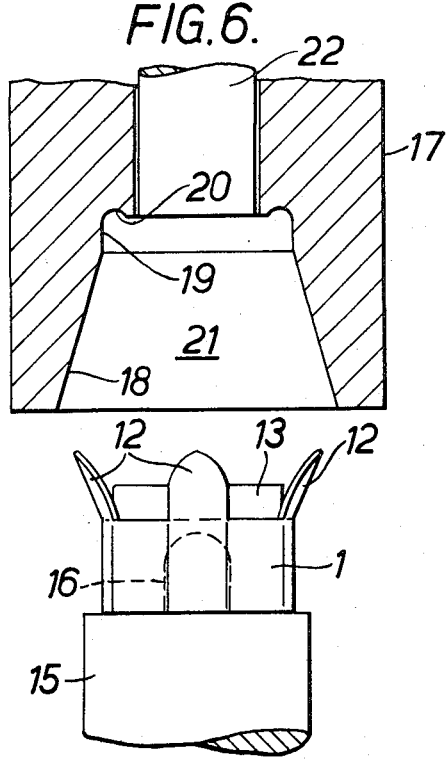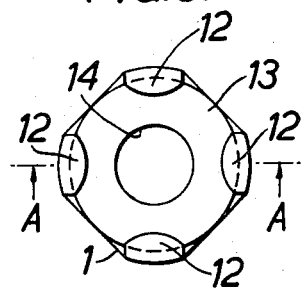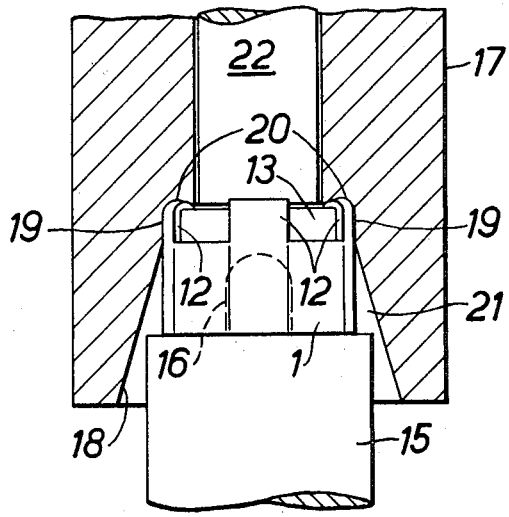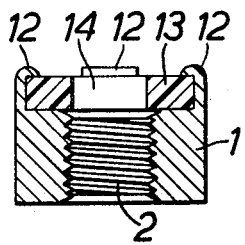

METHOD OF PRODUCING A LOCKING NUT WITH AN INSERT

The present invention relates to a method of producing a locking nut having an insert of resilient material, such as nylon, on its face. An ordinary four-sided nut is compressed between a die and a punch. The die is provided with a flared opening surrounded by a slant wall connected to a nut press-in hole, and the punch is provided with a tapered lower end adapted to match the shape of the flared opening of the die. The nut press-in hole has a diameter between that of the circumscribed and the inscribed circles of the nut to be processed. Thus, each corner of the nut is subjected to the drawing effect provided by the die and the punch as the nut is forced to enter the nut press-in hole by the punch. This changes the corners of the nut into outwardly opening thin tabs. These tabs are then folded inwardly over an insert previously placed on the fact of the nut. The insert is provided with an aperture of a diameter less than that of the thread hole of the nut at its center.

The advantage of the present invention is that it provides a practical commercial method of producing a locking nut with an insert with minimum labor and costs. There is no need for special skills or complicated equipment. Only a simple pressing apparatus to draw the nut corners into thin tabs, and to bend them so as to secure an insert therebetween is required. A further advantage lies in the outwardly opening tabs on the nut corners, which ensure against breakage in the course of the bending operation. Additionally, the undesirable possibility of a loose insert is avoided.

The invention will be more particularly described by way of the example illustrated in the drawing, in which:

FIG. 6 shows a side view in partial vertical section of the pressing punch and a worktable for folding the thin tabs of the nut over an insert;

FIG. 7 shows the thin tabs of the nut folded over the insert by the pressing punch;

FIG. 8 is a plan view of a finished locking nut with an insert on its face, produced by the method of the present invention; and FIG. 9 is a side view in vertical section of the finished locking nut taken along the line A—A in FIG. 8.

Figure 1:
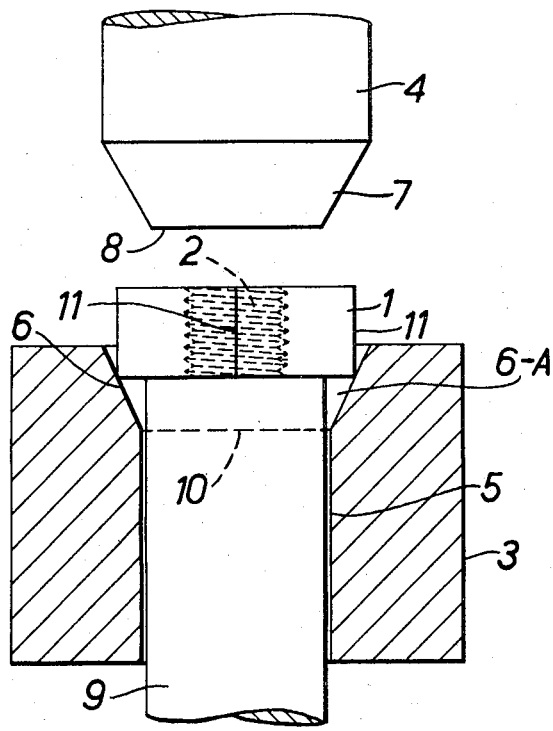
FIG. 1 is a side view in partial vertical section of the essential parts of a press apparatus comprising a punch and a die employed for practising this invention.
Figure 2:
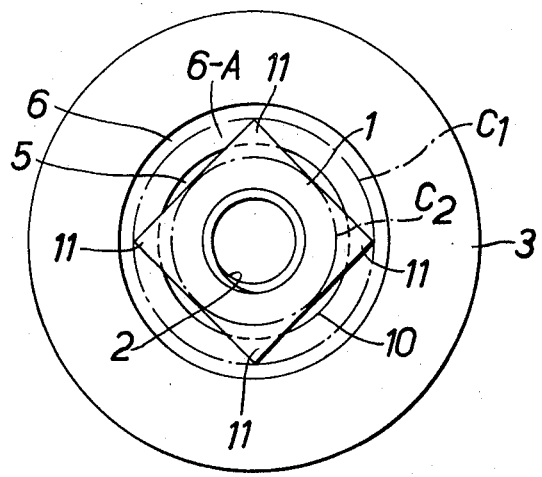
FIG. 2 is a plan view of the die portion of the press apparatus illustrated in FIG. 1, with an unprocessed nut nestled in its press-in hole.
Figure 3:
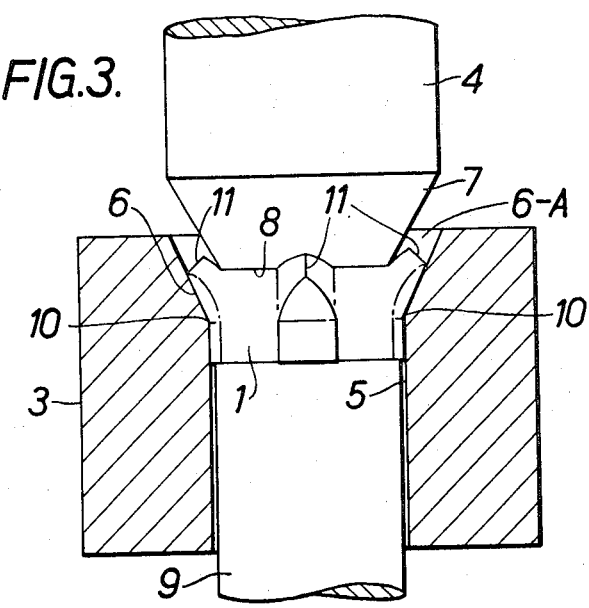
FIG. 3 shows a side view of the nut as it begins to be subjected to the drawing effect provided by the punch and the die.

An ordinary four-sided nut 1 with a thread hole 2 is compressed between a die 3 and a punch 4 in a standard commercial press. Generally speaking a small all-purpose press will be sufficient; a large power press is not required. The die 3 is provided with a cylindrical nut press-in hole 5 which is in communication with a flared opening 6–A defined by the surface of a slanted wall 6. The diameter of the hole 5 is selected to be between that of the circumscribed circle ($C_1$) and the inscribed circle ($C_2$) of the nut to be processed, as illustrated in FIG. 2. The punch 4 is provided with a tapered lower section 7 which enters the flared opening 6–A. The punch 4 at its lower end 8 has a diameter substantially the same as that of the inscribed circle ($C_2$) of the nut 1. After pressing, the nut 1 is unloaded by a knockout punch 9 capable of moving up and down in the nut press-in hole 5.

Figure 4:
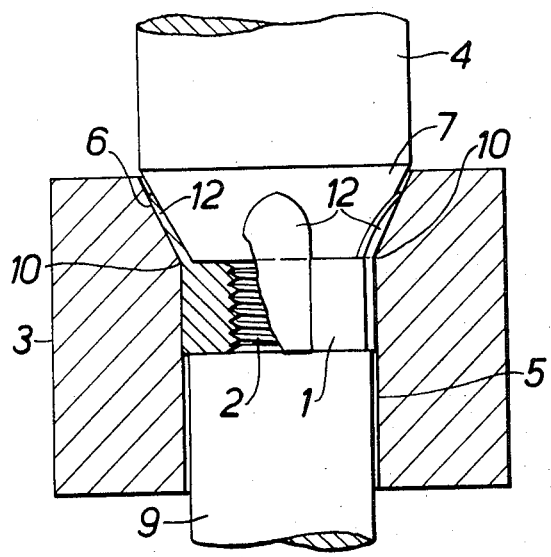
FIG. 4 shows a side view of the reformed nut provided with thin outwardly opening tabs on each corner.
Figure 5:
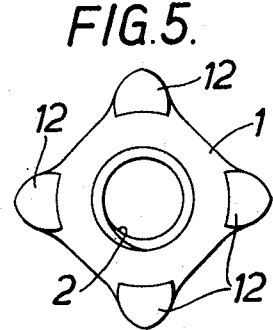
FIG. 5 is a plan view of the reformed nut provided with thin outwardly opening tabs on each corner.

In practice, the nut 1 is placed in the flared opening 6–A, with its corners 11 supported on the slanted wall 6 and extending radially beyond the diameter of the nut press-in hole 5. After the nut 1 has been thus placed in the flared opening 6–A of the die 3, the punch 4 is moved downwards onto the nut 1, its flat end 8 thereby exerting sufficient pressure to cause the nut 1 to move downwards. As the nut 1 is forced to enter the hole 5, the corners 11 of the nut 1 are subjected to a drawing effect between the die 3 and the punch 4. The drawing effect takes place at the edge 10 between the hole 5 and the slanted wall 6, and draws each corner 11 of the nut 1 into thin outwardly-opening tabs. It is of advantage, as illustrated in FIG. 4, to make the slant angle of the wall 6 larger than the tapering angle of the lower end 7 of the punch 4, since this gives a thicker and stronger base to the tabs 12 and facilitates the subsequent bending process. After the tabs have been completely formed, the nut 1 is removed from the die 3 by means of the knockout punch 9.

An insert 13 of resilient material, such as nylon, is now placed between the thin tabs on the face of the nut 1, with the aperture 14 of the insert aligned with the thread hole 2 of the nut. Best results are obtained when the aperture 14 of the insert 13 is smaller in diameter than the thread hole 2 of the nut. With the insert 13 on its face, the nut 2 is then placed on a worktable 15. The nut 1 is properly positioned on the worktable 15 by means of a pilot pin 16 extending vertically therefrom into the thread hole 2 of nut 1. The thin tabs 12 are folded over the insert 13 by means of a pressing punch 17. The pressing punch 17 is provided with a flared opening 21, which is defined by a flaring skirt 18, a waist 19 and a grooved shoulder 20, as illustrated in FIG. 6. A knockout punch 22 is provided for removing the nut 1 after the crimping operation.

In operation, after the nut 1 with the insert 13 has been placed on the worktable 15, the punch 17 is moved downwards. Gradually the outwardly opening tabs are straightened by engagement with the flaring skirt portion 18. The straightening is completed by the waist portion 19. As the punch 17 is further moved downwards, the straightened tabs are bent inwardly and downwardly by the groove of the shoulder 20, thus securing the insert 13 between the folded tabs.

While the invention has thus been described with respect to four-sided, four-cornered nuts, it will be understood that the invention is not so limited and is applicable to any nut no matter how many sides and corners it has. It will be likewise understood that it is not necessary to form tabs on each of the corners of the nut so long as at least two tabs are formed. The term "corner" as employed herein is not intended to mean only the region of intersection of two planar sides as shown in the drawings of the example, but is intended to encompass any portion of a nut which extends beyond the inscribed circle of the nut.

It will be understood that the claims are intended to cover all changes and modifications of the preferred embodiments of the invention herein chosen for the purpose of illustration which do not constitute departure from the spirit and scope of the invention.

What is claimed is:

1. A locking nut comprising:
   a. a metal nut having at least four sides and with a generally planar end face having a threaded hole extending therethrough and having at least two integral tabs extending from the periphery of one face of said nut and respectively extending from at least two rounded corners of said nut from which said tabs have been drawn, and spaced apart along said periphery so as to be in effective insert-retaining relationship with one another; and
   b. a non-metallic resilient insert having an aperture of smaller diameter than said thread hole of said nut and axially aligned therewith, said insert being secured to said face of said nut by said at least two tabs.

2. A locking nut comprising:
   a. a four sided nut with a generally planar end face having a threaded hole extending therethrough;
   b. an insert of non-metallic resilient material having an aperture smaller than that of said threaded hole of said nut and axially aligned therewith; and
   c. four tabs spaced apart along the periphery of said face of said nut and extending from rounded corners of said nut from which said tabs have been drawn, said tabs having portions folded over said insert to secure said insert in said axially aligned relationship with said thread hole of said nut.

3. The locking nut according to claim 2 wherein said insert is composed of nylon.

* * * * *